US008898289B1

(12) United States Patent
Soundararajan et al.

(10) Patent No.: US 8,898,289 B1
(45) Date of Patent: Nov. 25, 2014

(54) DISTRIBUTED EVENT PROCESSING METHOD AND ARCHITECTURE

(75) Inventors: Gokul Soundararajan, Sunnyvale, CA (US); Kaladhar Voruganti, San Jose, CA (US); Lakshmi Narayanan Bairavasundaram, Sunnyvale, CA (US); Vipul Mathur, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 167 days.

(21) Appl. No.: 13/069,301

(22) Filed: Mar. 22, 2011

(51) Int. Cl.
*G06F 15/173* (2006.01)
*G06F 13/00* (2006.01)

(52) U.S. Cl.
USPC .......................................... 709/224; 719/318

(58) Field of Classification Search
USPC .................................. 709/216, 223; 719/318
See application file for complete search history.

(56) References Cited

U.S. PATENT DOCUMENTS

| | | | | |
|---|---|---|---|---|
| 6,122,664 A * | 9/2000 | Boukobza et al. | | 709/224 |
| 6,144,993 A * | 11/2000 | Fukunaga et al. | | 709/208 |
| 6,415,333 B1 * | 7/2002 | Vasell | | 719/315 |
| 7,054,422 B2 * | 5/2006 | Delaney et al. | | 379/137 |
| 7,234,147 B1 * | 6/2007 | Gharavy et al. | | 719/318 |
| 7,287,063 B2 * | 10/2007 | Baldwin et al. | | 709/216 |
| 7,543,045 B1 * | 6/2009 | Agrawal et al. | | 709/220 |
| 7,669,206 B2 * | 2/2010 | Sherwani | | 719/318 |
| 7,673,011 B2 * | 3/2010 | Archer et al. | | 709/213 |
| 7,796,528 B2 * | 9/2010 | Yoshizawa | | 370/242 |
| 7,921,459 B2 * | 4/2011 | Houston et al. | | 726/22 |
| 7,949,350 B2 * | 5/2011 | Satou et al. | | 455/456.3 |
| 7,984,453 B2 * | 7/2011 | Alverson et al. | | 719/318 |
| 8,001,280 B2 * | 8/2011 | Blumrich et al. | | 709/252 |
| 8,064,364 B2 * | 11/2011 | Marshall | | 370/254 |
| 8,336,066 B2 * | 12/2012 | Murakami et al. | | 725/32 |
| 8,407,347 B2 * | 3/2013 | Zhang et al. | | 709/226 |
| 8,671,218 B2 * | 3/2014 | Hisgen et al. | | 709/237 |
| 2002/0120771 A1 * | 8/2002 | Delaney et al. | | 709/238 |
| 2002/0174248 A1 * | 11/2002 | Morriss | | 709/238 |
| 2002/0178397 A1 * | 11/2002 | Ueno et al. | | 714/4 |
| 2003/0067903 A1 * | 4/2003 | Jorgensen | | 370/338 |
| 2003/0069959 A1 * | 4/2003 | Tse | | 709/224 |
| 2003/0130975 A1 * | 7/2003 | Muller | | 706/50 |
| 2004/0078493 A1 * | 4/2004 | Blumrich et al. | | 709/250 |
| 2004/0224673 A1 * | 11/2004 | Satou et al. | | 455/414.3 |
| 2005/0013257 A1 * | 1/2005 | Garyfalos et al. | | 370/252 |
| 2005/0149468 A1 * | 7/2005 | Abraham | | 707/1 |
| 2006/0095529 A1 * | 5/2006 | McNamara et al. | | 709/206 |
| 2006/0168177 A1 * | 7/2006 | Kumar et al. | | 709/223 |
| 2006/0259968 A1 * | 11/2006 | Nakakoji et al. | | 726/22 |
| 2008/0104367 A1 * | 5/2008 | Blumrich et al. | | 712/11 |
| 2008/0133653 A1 * | 6/2008 | Fok et al. | | 709/203 |
| 2008/0134213 A1 * | 6/2008 | Alverson et al. | | 719/318 |
| 2008/0164997 A1 * | 7/2008 | Aritsuka et al. | | 340/539.13 |
| 2010/0235917 A1 * | 9/2010 | Ku et al. | | 726/25 |

(Continued)

*Primary Examiner* — Brian P Whipple
*Assistant Examiner* — Michael A Chambers
(74) *Attorney, Agent, or Firm* — Perkins Coie LLP

(57) ABSTRACT

Method and system for distributing a notification of an event occurring at a one entity to an affected entity. In one embodiment, entities are grouped into one or more groups so that an event occurring at one entity of the group is distributed to the other entities of the group ("affected entities"). If an event occurs at an entity managed by a local entity manager, a notification of the event can be routed to a remote entity manager that manages an affected entity. The local entity manager can use a distributed mapping to determine where to route the event notification. In one embodiment the mapping associates an entity to an entity manager.

29 Claims, 5 Drawing Sheets

(56) References Cited

U.S. PATENT DOCUMENTS

| | | |
|---|---|---|
| 2010/0278184 A1* | 11/2010 | Sailhan et al. ............... 370/400 |
| 2010/0332432 A1* | 12/2010 | Hirsch ........................... 706/21 |
| 2011/0022689 A1* | 1/2011 | Piepenbrink et al. ......... 709/221 |
| 2011/0191847 A1* | 8/2011 | Davis et al. .................... 726/22 |
| 2012/0158933 A1* | 6/2012 | Shetty et al. ................. 709/223 |

* cited by examiner

DISTRIBUTED EVENT PROCESSING METHOD AND ARCHITECTURE

FIELD OF THE INVENTION

At least one embodiment of the present invention pertains to an event notification infrastructure, and more particularly, to a method and system for routing a notification of an event to one or more entity managers for delivery to entities affected by the event.

BACKGROUND

The rapid worldwide growth in reliance upon computers, smart phones and other electronic processing devices in recent years have increased the demand for data storage. This increased dependence on digital data and data storage creates a need for greater storage efficiency.

Improving storage efficiency is an important goal driving optimizations in data centers, and other networked processing environments. Storage efficiency can be obtained through multi-tenancy, where multiple sets of data are stored at a component in a physical storage system. A "component" can refer to a physical and/or virtual device within the physical storage system or it can refer to a sub-device, such as a RAID system within a server, and/or a disk device within the RAID system. "Multi-tenancy" refers to the technique of employing two or more virtual components, such as servers, within one corresponding physical component (e.g., a physical computer). While the virtual components allow for efficient resource sharing in storage system, management of these virtual components can present challenges.

One problem in managing multi-tenancy in physical storage systems is finding a method to efficiently route infrastructure events throughout a data center, or other networked processing environment, for delivery to components that may be affected by such events, so that the affected components can respond appropriately. An infrastructure event is a change that can occur at a component within the physical storage system. The event can be a major change, such as the failure of the component, or a minor change, such as a policy change that reallocates resources of the component. In modern virtualized multi-tenant data centers the number of monitored components can be orders of magnitude higher than in a traditional data center, thus compounding the problem of efficiently routing infrastructure events.

Current storage management systems handle the problem of routing event notifications by using a single management machine. The single management machine operates over a list of entities that monitor components within an infrastructure and polls each entity for event notifications. The notifications are centrally gathered on the single management machine so that they can be delivered to entities monitoring components affected by the event. This method has at least two drawbacks: (1) the entire set of entities is kept in a single machine, thereby requiring a machine with large amounts of memory ("RAM"), and (2) event processing is limited by the performance of this one machine. Both drawbacks limit the efficiency and scalability of the current approach, thus making it not well-suited for handling large number of entities and events within a single virtualized data center.

SUMMARY

Introduced herein are a method and system for building a scalable, distributed event processing architecture to route event notifications to one or more entities that may be affected by events. The solution presented herein overcomes the prior art's problems relating to inefficient resource management and poor performance as experienced when using a single management system to respond to events and distribute event notifications to affected entities.

In one embodiment, the distributed event processing architecture contains storage management systems that build entity managers to route various event notifications, such as changes in application-level policies and/or changes in the infrastructure, to other entity managers so that the notifications can be delivered to an entity potentially affected by the events.

A storage system can include an entity manager and entities managed by the entity manager. An entity can be a storage system component, such as a disk, a logical container of data such as a volume, or a set of application/user data; or an entity can be designed simply to monitor another storage system component. An entity can be configured to generate a notification of an event occurring at the entity or at a monitored component. The disclosed techniques can use a variety of methods to optimize the delivery of events. Some examples of such techniques include: grouping entities based on their physical relationships (e.g., a volume is contained in an aggregate), partitioning entities using application-level information (e.g., grouping entities used by a particular application together), and efficiently placing the groups of entities on physical machines.

Entity managers have the ability to receive an event notification from an entity and route that notification to another entity manager so that the notification can be delivered to one or more other entities that, it has been previously determined, will be affected by the event (i.e., an "affected entity"). For example, and as explained below, an entity manager can route a notification to an affected entity by using a data structure, such as a routing table, to look up the address of the entity manager associated with the affected entity, and to send the notification to that address. The routing table can contain a list of other entity managers and the entities that they manage. The notification is routed to one or more of the other entity managers so that it can be delivered to the affected entities so that a corrective action can be taken.

The technique and system introduced here can be used advantageously with virtual machines of various designs and functions. For example, a virtual machine can be a virtual storage server, or an independent functional module or subsystem of a virtual storage server, used to perform the techniques described here.

BRIEF DESCRIPTION OF THE DRAWINGS

One or more embodiments of the present invention are illustrated by way of example and are not limited by the figures of the accompanying drawings, in which like references indicate similar elements.

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not necessarily all refer to the same embodiment.

Figure 1:
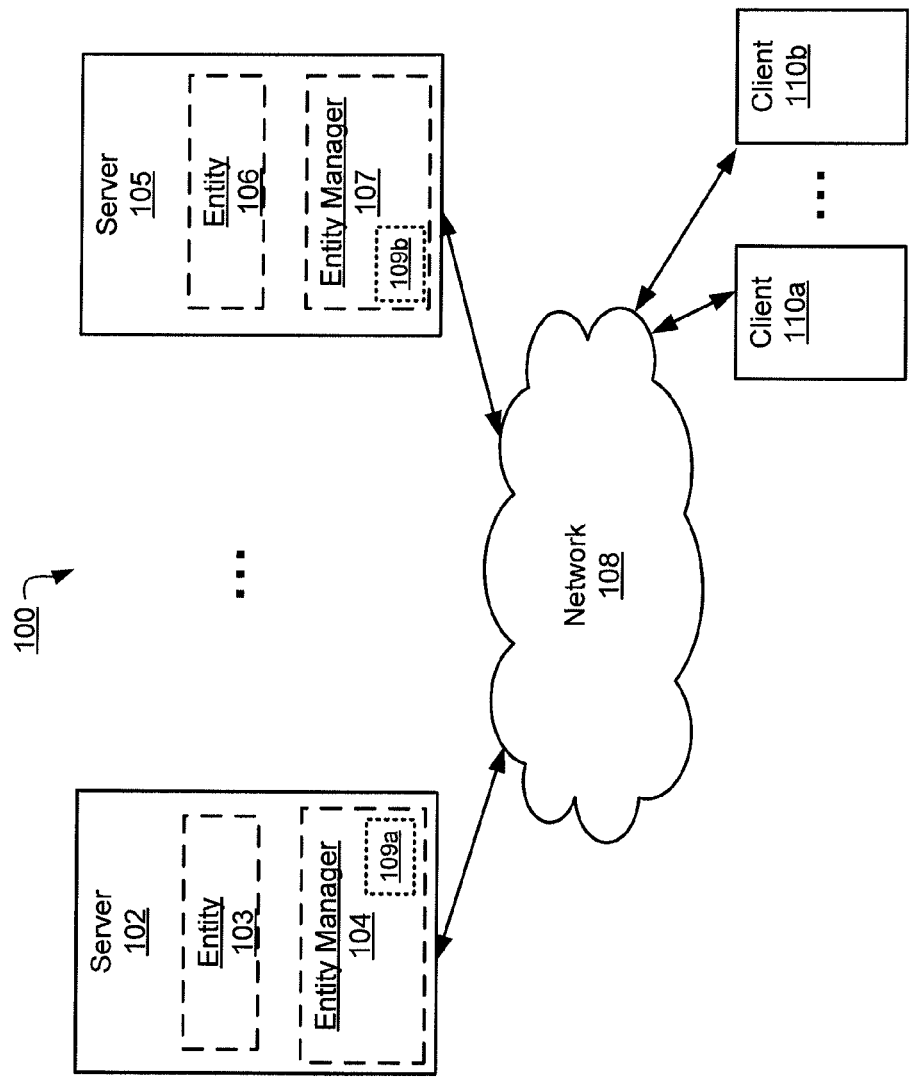
FIG. 1 shows a network storage configuration in which the techniques introduced here can be implemented.

FIG. 1 shows a network configuration in which the techniques introduced herein can be implemented. The network environment described herein is used to illustrate one type of network storage configuration in which the techniques can be implemented; however, other network storage configurations and schemes can be used for implementing the techniques introduced herein. Additionally, the techniques described are not limited to network storage and can be used with other network environments.

The technique and system introduced here can be used with virtual machines of various designs and functions. For example, a virtual machine can be a virtual storage server, such as can be used in a network storage environment, or an independent functional module or subsystem of a virtual storage server, used to perform the techniques described here.

FIG. 1 shows a network storage environment 100, which includes server systems 102 and 105, and clients 110, each connected to a network 108. Server system 102 contains an entity 103 and an entity manager 104. Server system 105 contains an entity 106 and an entity manager 107.

The environment 100 can be utilized to implement aspects of the invention. For example, in one embodiment, the environment 100 is used to route an event notification from entity 103 to entity 106, which had been previously determined to be potentially affected by the event. In this regard, entity 106 and other potentially affected entities (not shown) within the environment 100 are informed of, and can take appropriate action in response to, the event that occurred at entity 103, as further explained below.

Servers 102/105 and clients 110 may be, for example, conventional computing systems such as personal computers or server-class computers, equipped with operating systems. Alternatively, servers 102/105 can be special-purpose computers, such as network storage servers or appliances. The servers 102/105 may perform various functions and management operations for entities 103 and/or 106, such as routing an event notification occurring at one entity 106 to another entity 103 (or vice versa) that, it had been previously determined, might be affected by the event.

The network 108 connects the server 102 to server 105, client 110a and client 110b. The network 108 can utilize any known or convenient connection method and protocol(s), such as Ethernet, Fiber Channel, iSCSI, PCI Express, Hyper-Transport, or QuickPath. Alternatively, the network 108 can be a local area network ("LAN"), and/or a wide area network ("WAN"), and/or a global area network, such as the Internet, and can make use of any known or convenient network technologies.

Clients 110a and 110b can each be used to access data and information at server 102 and/or 105 via network 108. A server 102 or 105 can include many entities; however, to simplify description the singular case "entity" is used in relation to FIG. 1. Furthermore, server 102 and entity 103 are used as explanatory examples to describe the disclosed techniques. Server 105 and entity 106 can be assumed to be substantially similar to server 102 and entity 103, and therefore, to have the same features as those described for server 102 and entity 103, respectively.

An "entity" as described herein can be software, hardware, or a combination thereof that is configured to monitor a component of the server 102, such as a storage device, a disk controller, or a disk volume. An entity can be a "standalone" entity that is separate from the component. A "standalone" entity can be created by and operated by the server 102. Alternatively, an "entity" can be a "smart" entity that is part of the storage system component, such as the storage server. Both a "standalone" entity and a "smart" entity can be configured to monitor the occurrence of an event at the component and report a notification of the event to an affected entity, as further explained below.

An "entity" such as entity 103 or 106, can be a physical entity, a logical entity, or an application/data entity. A physical entity monitors hardware devices, such as a disk. A logical entity monitors an abstraction of a physical device, such as a virtual server. An application/data entity monitors a dataset created by a user and/or an application, such as a data file, database record, or data backup.

An entity 103/106 can be determined to be an "affected entity" (i.e., an entity potentially affected by a particular type of future event) based on a connection between that entity and the entity detecting the event. A connection is a physical or logical connection that interconnects the entities' components.

A physical connection is a connection represented by a hardware constraint. The hardware constraint can be the result of a component's physical wiring. For example, disks can be physically connected (i.e., wired) to a shelf. The failure of the shelf would potentially affect the disks connected to the shelf, thus, the disk monitoring entities could be determined to be affected entities.

A logical connection is based on a software constraint that defines a relationship between entities. Logical connections can be set up by software within a component, the server, entity manager, and/or third-party software programs. For example, a volume is a logical group of information that can be stored at multiple physical storage devices that cooperate to define an overall logical arrangement of the information. A volume is logically connected to its underlying aggregate based on a software configuration in the aggregate and/or volume. An aggregate is a logical association that can contain one or more volumes. Additionally, different entities may be governed by defined software-based policies (e.g., correct a disk failure by using a spare disk), the storage administrator (e.g., an aggregate storage use may not exceed 80% of the underlying capacity), or an application (e.g., maintain average latency under 10 ms).

Figure 2:
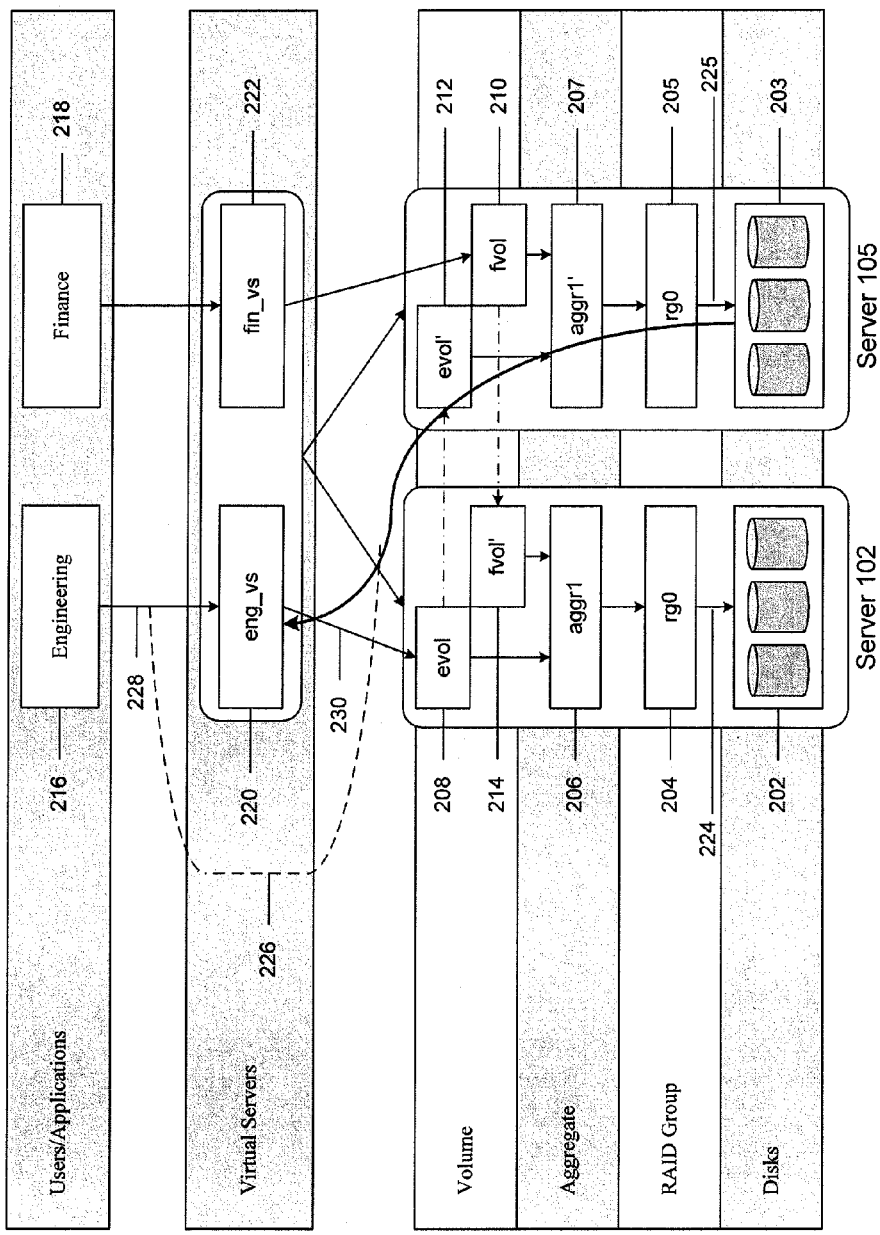
FIG. 2 is an illustration of entities and their respective connections in a network storage system.

FIG. 2 is an illustration of various entities 202, 204, 206, 214, 208, and 220, at server 102, the entities 203, 205, 207, 210, 212, and 222 at server 105, and their respective connections. Server 102 can include or be attached to one or more physical storage devices monitored by a storage entity 202. The storage devices can be disks, for example, which can be combined into a RAID group managed by a RAID group ("rg0") entity 204. One or more RAID groups can be managed through an aggregate ("aggr1"), monitored by entity 206. Aggr1 can further be configured to contain volumes, such as an engineering volume ("evol"), monitored by entity 208, and a standby copy of a finance volume ("fvol'"), monitored by entity 214. Evol can further store virtual server eng_vs, monitored by entity 220, and application data ("Engineering"), monitored by entity 216. Evol can be replicated for fault-tolerance as engineering replica volume ("evol'"), monitored by entity 212, at server 105. Similarly, financial volume ("fvol"), which is monitored by entity 210, is replicated as fvol' at server 102. A user and/or application monitored by entities 216 and 218 can access the engineering and finance data using virtual servers monitored by virtual server entities 220 and 222, respectively.

FIG. 2 also shows examples of various physical connections and logical connections (i.e., "dependencies") 224, 226 between entities. A dependency can be used by the techniques introduced here to determine whether an event received by an entity will affect one or more of the other entities. For example, a physical connection 224 connects together entity 204 and the storage entity 202, and a physical connection 225 connects together entity 205 and the storage entity 203. Specifically, logical connections 226 connect evol' entity 212 to an aggr1' 207 and connect fvol' entity 214 to the aggr1 entity 206 based, for example, on an application policy that requires two copies of engineering data to be maintained at all times. Furthermore, virtual server entity 220 has two logical connections: one logical connection 230 to the engineering volume evol and another connection 228 from an engineering application that accesses the virtual server entity 220. Given knowledge of these dependencies (as specified by the entity manager and/or an administrator), a notification of a event received at any one of entities 202-222 can be routed so that it can be delivered to an affected entity. As described above and further explained below, an entity can be identified by an entity manager as an affected entity, based on the entity's assignment to the same group as the entity detecting the event.

Figure 3:
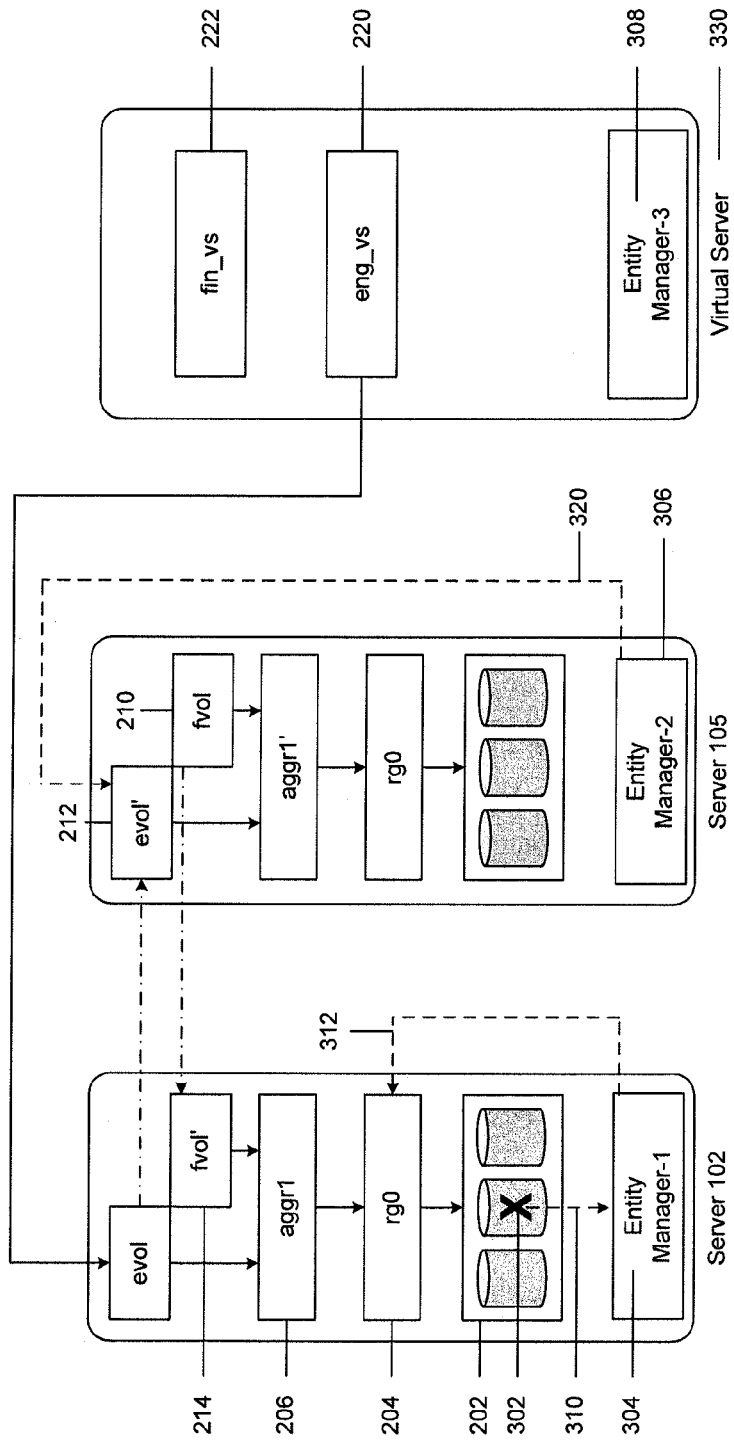
FIG. 3 is an illustration of a process for routing a notification of an event so that it can be delivered to affected entities.

FIG. 3 is an illustration of a process for routing a notification of an event 302 so that it can be delivered to an affected entity. Some entities (i.e., an "entity manager" 304) have the ability to receive a notification of an event 302 from an entity monitoring the event 302 and route that notification to another entity manager 306, so that the notification can be delivered via path 320 to an affected entity, for example in this case, evol' entity 212.

FIG. 3 illustrates three entity managers 304, 306, and 308. An entity manager can manage entities on a single physical server 102/105 and/or virtual server 330, or within multiple separate physical and/or virtual servers. For example, entity manager 304 can manage the entities 202, 204, 206, 208, and 214 at server 102, entity manager 306 can manage the entities 203, 205, 207, 210 and 212, and entity manager 308 can manage the entities 220 and 222.

An entity manager can be instantiated by another entity manager or by a server, such as server 102, 105, or 330. An entity manager can be dynamically instantiated by the server 102/105/330, based on statistics gathered by another entity manager and/or server 102/105/330. For example, if an entity managed by a remote entity manager sends a threshold number of event notifications to the remote entity manager, the remote entity manager (or server) may instantiate a new entity manager at the server hosting the entity to reduce the delay in delivering event notifications and to reduce the network 108 bandwidth required to send the event notifications.

Similarly, an entity manager 104 can be decommissioned (or removed) from a server 102 by another entity manager or server 105, 330. An entity manager 104 may be removed by deleting an instance of the entity manager 104 at the server 102 or by disabling a configuration of the entity manager 104, for example.

An entity 103 can be configured by an entity manager 104 to communicate a notification of an event 302 to the entity manager 104 for deliver to an affected entity. The entity configuration (not shown) can contain a network address of the entity manager 104 that manages notifications from that entity 103. The entity 103 can send the event notification to the network address for delivery to the entity manager 104. The entity manager 104 can manage event notifications from the entity 103 by at least being configured to receive the event notification from the entity 103 and to determine another entity or entities that may be affected by the event 302.

In one embodiment, the entity manager 304 routes a notification directly to the affected entity or entities. For example, if an entity 202 located at server 102 has an event 302, that entity 202 can forward, via path 310, a notification of the event to entity manager 304. Entity manager 304 may determine that another entity at server 102 is affected by the event. In this case, the entity manager 304 can directly deliver the event to the affected entity because an entity manager 304 can be configured to deliver notifications to "local" entities (i.e. an entity that is located at the same server as the entity manager).

In another embodiment, the entity manager 304 can route the notification to one or more other entity managers that each manage at least a subset of the affected entity or entities. By distributing entity managers across an event processing architecture, the resources that are required to process a notification across multiple servers 102/105/330 are spread out, thus potentially increasing the reliability of delivering a notification upon a failure of a single server 102/105/330.

In an embodiment, upon an event 302, such as a disk failure, a notification of the event 302 is captured by the storage entity 202 that monitors the failed disk. An event notification is generated at the storage entity 202 to represent and inform other affected entities of the event. For example, if the disk that is monitored by the storage entity 202 becomes faulty, the storage entity 202 can generate a notification indicating that the underlying disk has malfunctioned. This notification can be routed to affected entities so that a corrective action may be taken, such as reconfiguring an application (not shown) from accessing data from the failed disk to accessing a standby copy of the data at a standby disk. The notification can be sent from the storage entity 202 via path 310 to the entity manager 304, which is responsible for monitoring the storage entity 202. The entity manager 304 can determine which other entities are affected by the event 302 by reviewing a log or routing table, as explained below. In this example, it may be determined that entities 204, 206, 214, and 212 are affected. The entity manager 304 can therefore send its local entities 204, 206 and 214 the notification and route the notification to entity manager 306, so that the notification can be delivered to affected entity 212 via path 320. If an affected entity is managed by entity manager 306 and/or 308, the local entity manager 304 can, upon receiving the notification from the storage entity 202, route the notification via the network 108 to the entity manager 306, for example, by using communication techniques known in the art, such as transporting the notification as data packets using the Transmission Control Protocol/Internet Protocol (TCP/IP).

Continuing with the example from above, if the notification is routed via path 312 to the entity 204, for example, the entity 204 may decide to correct the fault by using a spare disk and reconstructing the RAID group. If the notification affects the finance virtual server entity 222, the notification can be routed to entity manager 308, which is managing the finance virtual server entity 222. The entity manager 308 can send the notification to the finance virtual server entity 222 which can take further corrective actions. Specifically, if reconstruction of the RAID group consumes such a large fraction of physical resources that the server 102 reaches its storage capacity, the virtual server entity 222 may temporarily route traffic to a standby node (not shown) to meet SLOs.

There are various possible methods for routing notifications between entity managers. One such method is for an entity manager to use a mapping 109 (e.g., a data structure such as a routing table or log) that associates entity managers with their respective entities. The mapping 109 can contain a list of entity managers, the server 102/105/330 where each respective entity manager can be located, the entities managed by a respective entity manager, and one or more affected entities associated with each respective entity manager. The mapping 109 can be dynamically created and/or modified by an entity manager based on the dependencies (i.e., the physical and logical connection between entities), as discussed above. For example, if a new disk is added to the disks managed by entity 202, the physical connection between the newly added disk and the RAID group can be used by an entity manager to indicate in the mapping 109a that the entity 202 monitoring the newly added disk is an entity affected by an event 302.

In one embodiment a centralized entity manager (not shown) can maintain a mapping (e.g. a routing table) between all entity managers within the environment 100 and the one or more entities managed by each entity manager 304/306/308. In another embodiment, a portion of a complete mapping 109a and 109b is maintained at each entity manager 304/306/308 for routing notifications. The latter approach is advantageous because of its resiliency; a distributed mapping can be scaled up or down by adding or removing other entity managers, without creating a single point of failure.

To increase the efficiency of communicating notifications, affected entities can be associated into one or more groups that can be distributed across multiple servers 102/105. A group can be used to associate entities that share a physical and/or logical connection. Grouping entities provides several advantages, such as reducing the number of notifications that are exchanged between different servers, reducing the amount of data stored on each server, reducing the amount of computation each server executes to processes notifications, and increasing the parallelism and resiliency of the event processing system. A group of affected entities can be notified of an event that has detected by another entity within that group. Each group of entities can be maintained in the route mapping 109, mentioned above.

There are various possible techniques for grouping entities. In one embodiment, entities can be grouped based on the physical structure of the environment 100, such as by associating all entities on one server 102 with a particular entity manager 304. This approach is advantageous because a hardware event (e.g., disk failure) at a local server typically can be corrected using local resources; thus, typically no notification needs to be sent to a remote server. For example, a disk failure is typically corrected by using a spare disk in a shelf of other disks, or if no spare disk exists, by using spare disk in other shelves connected to a storage network.

In a second embodiment, entities can be grouped based on entity type (e.g., volume entities are grouped together and aggregate entities are grouped together). Grouping based on entity type can be advantageous if the grouped entities tend to affect or be affected by another entity or entities. For example, if a server is configured so that many volumes share an underlying aggregate, then any volume-level or aggregate-level event will generally affect all of the volumes, so that the routing of notifications is local to one server. An entity type grouping can be maintained in the route mapping 109, as mentioned above, to allow the notification to be routed based on a particular entity type.

In a third embodiment, entities can be dynamically grouped by an entity manager based on historical data. For example, entity manager 304 can store data associated with previously routed notifications to determine routing efficiency and other statistics. As a more specific example, an entity manager 304 can determine, from the quantity of notifications that have been exchanged between entity managers, whether a performance bottleneck has been causing an undue delay in notification delivering. In response, the entity manager 304 can dynamically regroup entities to increase performance and efficiency and reduce delays. In another example, an entity may be regrouped to reduce the number of notifications exchanged between entity managers, reduce the computation executed on a particular server hosting an entity manager, or reduce the overall latency of propagating notifications. Changes to a group, such as regrouping an entity from one group to another group, creating a new group, or removing an entity from a group, can automatically generate an update to the map (mentioned above) at an entity manager so that the entity manager can determine affected entities.

Figure 4:
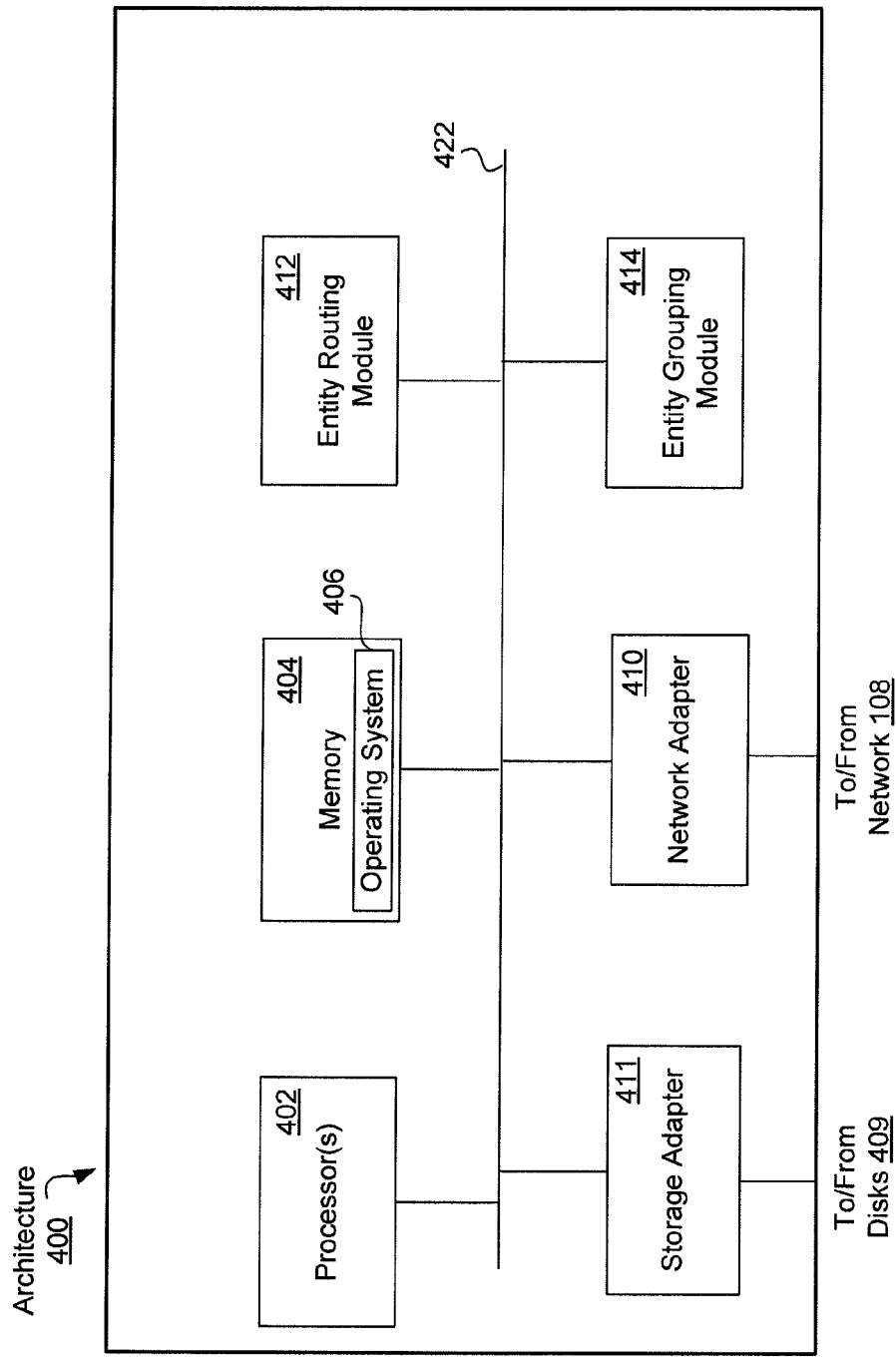
FIG. 4 is a high-level block diagram showing an example of hardware architecture of a processing system that can implement the techniques described above.

FIG. 4 is a high-level block diagram showing an example of the hardware architecture of a processing system 400 that can implement the techniques described above. Processing system 400 can embody, for example, server 102 or server 105. In the illustrated embodiment, the processing system 400 includes a processor subsystem 402 that includes one or more processors that can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The processing system 400 further includes a memory 404 storing an operating system and data 406, a network adapter 410, a storage adapter 411 (optional), an entity routing module 412, and an entity grouping module 414, each interconnected by an interconnect 422. Alternatively, entity routing module 412 and/or entity grouping module 414 can be implemented within processor subsystem 402.

The processing system 400 can be embodied as a single- or multi-processor storage system that implements a high-level module, such as a storage manager, to organize entities into one or more groups and to route a notification of an occurrence of an event at a component to one or more entity managers that manage affected entities.

The memory 404 can include storage locations that are addressable by the processor(s) 402 and modules 410 through 414 for storing software program code and data structures associated with the techniques introduced here. The processor 402 and components may, in turn, include processing elements and/or logic circuitry configured to execute the software code and manipulate the data structures. The operating system 406, portions of which typically reside in memory 404 and are executed by the processor(s) 402, functionally organizes the processing system 400 by (among other things) configuring the processor(s) 402 to invoke storage- and file-related operations in support of the present invention. Other processing and memory implementations, including various computer readable storage media, may be used for storing and executing program instructions pertaining to the techniques introduced here.

The network adapter 410 includes one or more ports used to couple the processing system 400 of the servers 102/105 over the network 108, such as via a WAN, virtual private network implemented over a public network (Internet) or a shared LAN. The network adapter 410 thus can include the mechanical elements and signaling circuitry needed to connect the processing system 400 to a network.

The storage adapter 411 provides an interface through which the processor(s) can access an external mass storage subsystem, which may contain any type of attached array of writable storage media, such as magnetic disk or tape, optical disk (e.g., CD-ROM or DVD), flash memory, solid-state disk (SSD), electronic random access memory ("RAM"), micro-electro mechanical and/or any other similar media adapted to store information, including data and parity information. However, as illustratively described herein, the information is stored on a non-volatile mass storage device (not shown).

The entity grouping module 414 contains logic to associate entities into one or more groups. As previously described, a physical and/or logical connection can denote the dependency between entities, so that an event at one entity can affect another entity that has a connection/dependency to that one entity. As mentioned above, a group can be used to cluster entities that share a physical and/or logical connection. In response to an event associated with a first entity within the group, a notification of the event can be directed to the other entities within the group, so that all entities affected by the event can take appropriate action.

The entity routing module 412 maintains each of the groups in a data structure 109, such as a log or a routing table that maps each entity to one or more entity managers within the environment 100. A designated ("centralized") entity manager can maintain a single mapping for the entire environment. Alternatively, the mapping 109 can be distributed among the entity managers of the environment 100 so that each entity manager maintains a portion of the mapping. In either scenario, the entity manager uses its mapping to determine which entity or entity manager to route the notification.

Reassigning an entity from one group to another group, creating a new group, or removing an entity from a group can cause the mapping to be automatically updated, as described above, to reflect an association between the entity, its group, its managing entity, and potentially other information, such as the network address of the entity manager.

The entity routing module 412 also contains logic to communicate event notifications between entity managers. As previously discussed, when an event occurs, the entity that is monitoring that event can send an event notification to its local entity manager. The local entity manager can use the entity grouping module 414 to locate determine any affected entities so that notification can be delivered.

If the affected entity is an entity managed by the local entity manager, the local entity manager can use the entity routing module 412 to send the notification directly to the affected entity, without needing to route the notification to a remote entity manager.

If the affected entity is an entity managed by a remote entity manager, the local entity manager can route the notification to the remote entity manager, and the remote entity manager can deliver the notification to the affected entity. The route from the local entity manager to the remote entity manager can be determined from the mapping, or routing table, stored at the local entity manager, as described above. The mapping can include the address of the server that hosts the remote entity manager, such as a network destination address that is accessible via a network, for example.

In one embodiment, the entity routing module 412 can route a notification to multiple affected entities, where each entity is managed by a single remote entity manager. For example, after receiving the notification from the local entity manager, the remote entity manager can create and send copies of the notification to each of the affected entities. Additionally or alternatively, the entity routing module 412 can route a notification to multiple remote entity managers so that it can be delivered to each respective affected entity. The entity routing module 412 can route a notification to multiple different entity managers by, for example, creating duplicates of the notification that can be sent from the local entity manager to each remote entity manager so that they can be delivered to each affected entity managed by a respective remote entity manager.

Figure 5:
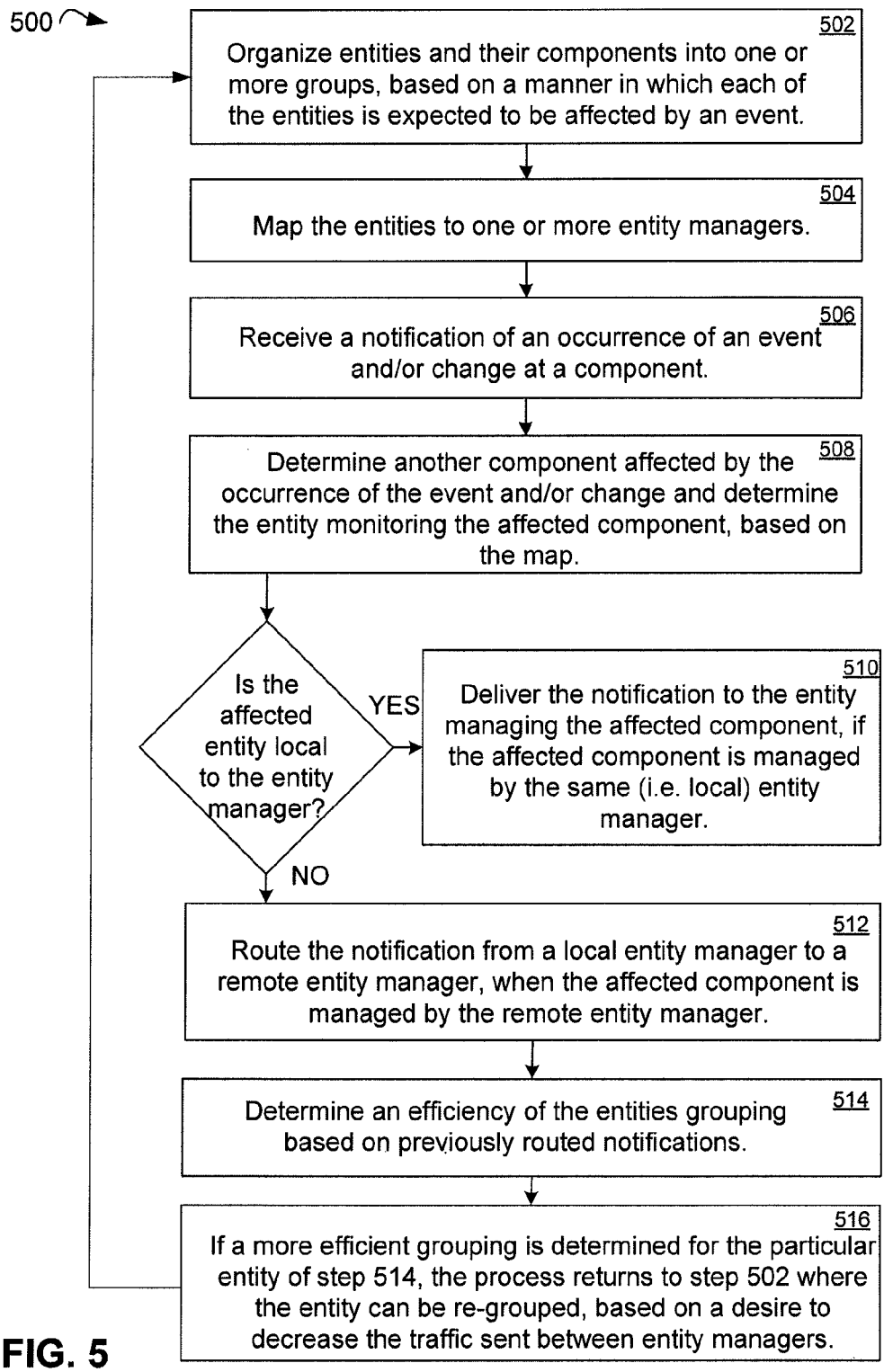
FIG. 5 is a flow diagram illustrating a process for communicating an event notification from one entity to another entity via distributed entity managers.

FIG. 5 is a flow diagram illustrating a process for communicating an event notification from one entity 103 to another entity 105. In step 502, the entity manager 104 organizes entities and their components into one or more groups, based on the manner in which each of the entities is expected to be affected by an event. As detailed above, entities can be grouped based on their physical location (e.g., entities in a server 102 are grouped together), type (e.g., entities that monitor volumes are in one group, and entities that monitor network adapters are in another group), and dynamically (e.g., entities can be moved from one group to another group based on real-time performance data).

Groups can be created manually, randomly, and/or dynamically at the entity manager. For example, by creating an administrative policy at the entity manager an administrator (or other user) can manually specify that entities having similar characteristics (e.g., entities monitoring volumes, or entities located in a particular geographic location) be assigned to the same group. Alternatively, entities can be randomly assigned by an entity manager into one or more groups. Regardless of whether an entity was manually or randomly assigned to a particular group, the entity manager can dynamically reassign an entity to another group to optimize performance, as further explained below.

In step 504, the entity manager 104 maps each of the entities to one or more other entity managers. An entity manager 104 can route a notification that is received from one entity 103, such as an entity receiving an event notification from its monitored component, to one or more other entities or entity managers. As described above, the mapping can provide details of the association between an entity and an entity manager responsible for delivering a notification to that entity 106. A single entity manager can manage many entities, regardless of where the entities are located the group(s) with which the entities are associated.

In step 506, an entity receives a notification of an occurrence of an event at a component. The event may be a minor event, such as a disk failure, or a major event, such as a RAID controller failure or server failure. Similarly, the event may be a minor or major policy change, such as increasing a threshold storage space that is available for a user and/or application. The notification can be a message or other indication that the event has occurred, or is occurring at the component. The notification can include information that is used to determine the nature of the event, such as which component had the event, the entity that initiated the event notification, and one or more affected entities. The notification can be generated by the component at which the event occurred or was initially detected, and captured by the entity monitoring the component. The notification can be distributed to an affected entity that monitors a component potentially affected by the event. In one embodiment, the entity monitoring the changed component sends the notification to an entity manager responsible for managing the changed entity and the entity manager routes the notification to an affected entity.

In step 508, after the entity sends the notification to the entity manager, the entity manager determines which component is affected by the occurrence of the event and the entity monitoring that component. Once the notification is received, the entity manager can use the information within the notification (described above) and the mapping to determine which affected entities to which the notification should be routed, as described above.

In step 510, an entity manager delivers the notification, described in step 508, to the entity monitoring the component affected by the event, if that entity is managed by the entity manager.

In step 512, the entity manager delivers the notification, described in step 508, to a remote entity manager, if the entity monitoring the component at which the event occurred is managed by the remote entity manager. In some scenarios, multiple affected entities may exist, some of which are managed by a local entity manager, as described in step 510, and others are managed by one or more remote entity managers. The notification may be copied and separately delivered to the affected local entities and routed to each remote entity manager having at least one affected entity.

Step 514 is an optional step that can be performed by an entity manager or server to determine the efficiency of an entity's group(s), based on previously routed notifications to that entity. Each entity manager and/or server can store statistics related to a previously routed notification. After one or more notifications have been routed to various remote entity managers, these statistics can be mined for information that would be useful in determining the efficiency of the entity groupings. For example, a particular entity may be grouped based on its physical location at a remote server and managed by a remote entity manager at the remote server. Statistics may indicate that a threshold value of notifications is being sent from the local entity manager to the remote entity manager. The statistics may also indicate that a maximum threshold number of notifications are being routed per hour from the local entity manager to the remote entity manager. A more efficient routing method and/or grouping for the particular entity might be determined so that fewer notifications are sent between entity managers, for example.

In step 516, the entity manager determines whether to reassign the particular entity of step 514 to a more efficient group. If the entity manager does determine that reassigning the entity is advantageous, as previously mentioned above, the process returns to step 502 where the entity manager can reassign the entity to a different group.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); RAM; magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   grouping a plurality of entities into one or more groups within a distributed event processing architecture, according to a manner in which each of the plurality of entities is expected to be affected by an event, wherein to be affected by an event at an entity comprises the entity to be dependent for its operation, at least in part, upon a resource associated with the event;
   operating a plurality of entity managers in the distributed event processing architecture, each said entity manager configured to route to at least one other entity manager of the plurality of entity managers an event notification in response to an event;
   receiving, at a first entity manager, an event notification associated with an occurrence at a first component;
   identifying a second component affected by the occurrence;
   identifying an entity monitoring the second component;
   determining that the entity monitoring the second component is not located on a same server as the first entity manager;
   routing the event notification associated with the occurrence to a second entity manager configured to manage the entity monitoring the second component;
   assessing an efficiency of the one or more groups based on a number of notifications, including the event notification, passed between the first entity manager and the second entity manager; and
   reassigning the entity monitoring the second component to another group of the one or more groups based on the efficiency assessment, the reassignment reducing the rate at which notifications are passed between the first entity manager and the second entity manager.

2. The method of claim 1, wherein an entity of the plurality of entities is a component of a processing system, and in response to an occurrence of the event, the entity communicates the event notification to the at least one other entity manager of the plurality of entity managers.

3. The method of claim 1, wherein a first entity of the plurality of entities is determined to affect a second entity of the plurality of entities based on a dependency between the first entity and the second entity, wherein the dependency is a hardware or a software connection between the first entity and the second entity.

4. The method of claim 1, wherein a group of the one of more groups is created based on a physical location of the entities within the group.

5. The method of claim 1, wherein a group of the one of more groups is created based on an entity type, wherein each entity in the group has the same entity type.

6. The method of claim 5, wherein the entity type corresponds to a class of components within the distributed event processing architecture.

7. The method of claim 1, wherein a new group of the one of more groups is automatically created in response to the routing of the event notification from one entity manager of the plurality of entity managers to another entity manager of the plurality of entity managers, so that the event notification can be delivered to an affected entity of the plurality of entities, and wherein the affected entity is added as a member of the new group.

8. The method of claim 1, wherein the distributed event processing architecture includes a plurality of processing systems, each processing system having an entity of the plurality of entities.

9. The method of claim 8, wherein each processing system further includes a local entity manager of the plurality of entity managers, and the local entity manager is configured to send the event notification to be delivered to an entity managed by the local entity manager.

10. The method of claim 9, wherein a route between the local entity manager and a remote entity manager of the plurality of entity managers is determined based on information stored in a record available at the distributed event processing architecture, and wherein the information includes an address of the destination entity manager and a mapping associating the remote entity manager with one or more entities managed by the remote entity manager.

11. A method comprising:
grouping a plurality of entities into one or more groups within a distributed event processing architecture, based on the manner in which each of the plurality of entities is expected to affect one or more other entities of the plurality of entities in response to an event within the distributed event processing architecture, wherein to be affected by an event at an entity comprises the entity to be dependent for its operation, at least in part, upon a resource associated with the event;
in response to an event occurring within the distributed event processing architecture, the event associated with an occurrence at a first component, identifying a first group, of the one or more groups, that contains a first entity, of the plurality of entities, the first entity configured to monitor the first component;
identifying a first entity manager that manages the first group;
identifying a second component affected by the occurrence;
identifying a second entity monitoring the second component;
determining that the second entity monitoring the second component is not located on the same server as the first entity manager;
routing an event notification for the event from the first entity manager that manages the first group to a second entity manager that manages the second entity,
assessing an efficiency of the one or more groups based on a number of notifications passed between the first entity manager and the second entity manager; and
reassigning the second entity monitoring the second component to another group of the one or more groups based on the efficiency assessment, the reassignment reducing the rate at which notifications are passed between the first entity manager and the second entity manager.

12. The method of claim 11 further including, in response to information generated based on the routing of the event notification to the second entity manager, determining a third group of the one or more groups for the second entity.

13. The method of claim 12, wherein, if the second entity were placed in the third group, a delivery time of the event notification is less than a delivery time of the event notification when the entity is in the second group.

14. The method of claim 13, wherein the second entity is automatically removed from the second group and added to the third group from the one or more groups.

15. The method of claim 11, wherein an entity of the plurality of entities has a capability of an entity manager of the plurality of entity managers, such that the entity can route a notification indicating the occurrence of the event to other entity managers of the plurality of entity managers, so that the event notification can be delivered to an affected entity in the one or more groups.

16. The method of claim 15, wherein an entity of the plurality of entities monitors the first component for the occurrence associated with the event, and in response to the occurrence of the event, the entity monitoring the component communicates the event notification to an entity manager that is local to the processing system.

17. The method of claim 16, wherein the event is an event or policy that affects the first component of the processing system.

18. The method of claim 17, wherein a group of the one of more groups is based on:
a physical location of the entities within the group, or
an entity type of the entities in the group, and wherein the entity type corresponds to a class of components within a storage processing system.

19. The method of claim 11, wherein a group of the one of more groups is automatically created in response to the routing of the event notification from one entity manager of the plurality of entity managers to another entity manager of the plurality of entity managers, so that the event notification can be delivered to an affected entity of the plurality of entities, and wherein the affected entity is automatically added to the created group.

20. The method of claim 11, wherein the route between entity managers is determined from information in a record, portions of which are distributed to a subset of the entity managers of the plurality of entity managers such that each entity manager of the subset contains a portion of a mapping that associates an entity manager of the plurality of entity managers with an affected entity.

21. A first entity manager comprising:
a grouping module to group a plurality of entities into one or more groups within a distributed event processing architecture, based on the manner in which each of the plurality of entities is expected to affect one or more other entities of the plurality of entities in response to an event within the distributed event processing architecture, wherein to be affected by an event at an entity comprises the entity to be dependent for its operation, at least in part, upon a resource associated with the event;
a routing module configured to route to a next entity manager a notification of an occurrence of the event of the specified type, so that the notification can be delivered to a next entity of the plurality of entities, wherein the next entity is in a group of entities that were previously determined to be potentially affected by the event of the specified type;
at least one processor;
a memory comprising instructions executable by the at least one processor to cause the first entity manager to:
receive an event notification associated with an occurrence at a first component;
identify a second component affected by the occurrence;
identify an entity monitoring the second component;
determine that the entity monitoring the second component is not located on the same server as the first entity manager;

assess an efficiency of the one or more groups based on a number of notifications passed via the routing module to a second entity manager configured to manage the entity monitoring the second component; and reassign the entity monitoring the second component to another group of the one or more groups based on the efficiency assessment, the reassignment reducing the rate at which notifications are passed between the first entity manager and the second entity manager.

22. The entity manager of claim 21, wherein a route between the first and next entity managers is determined by using a routing table, wherein portions of the routing table are distributed and stored at each of the first and next entity managers, and wherein the portion of the routing table at the first entity manager contains a mapping associating the next entity with the next entity manager and contains an address of the next entity manager.

23. The entity manager of claim 21, wherein a group of the one of more groups is based on an entity type, wherein each entity of the group has the same entity type, and wherein the entity type corresponds to a class of components within the distributed event process architecture.

24. The entity manager of claim 23, wherein the entity type is selected from a group comprised of a RAID group, volume, virtual server and application.

25. The entity manager of claim 21, wherein the event of the specified type is an event or policy that occurs at a component monitored by an entity of the plurality of entities.

26. The entity manager of claim 21, wherein the route to the next entity manager is determined from information in a record at the distributed event processing architecture, and wherein the information includes a mapping associating the next entity manager with an affected entity.

27. The entity manager of claim 26, wherein portions of the record are distributed to the first entity manager and the next entity manager so that the first and next entity managers each contain a portion of the entire mapping.

28. The entity manager of claim 21, wherein the first entity manager is implemented by a first virtual server.

29. The entity manager of claim 28, wherein the next entity manager is implemented by a second virtual server.

* * * * *